United States Patent [19]

Hoogendijk

[11] 3,906,152

[45] Sept. 16, 1975

[54] APPARATUS FOR READING A DISC-SHAPED RECORD CARRIER

[75] Inventor: Adrianus Huibert Hoogendijk, Eindhoven, Netherlands

[73] Assignee: U.S. Philips Corporation, New York, N.Y.

[22] Filed: May 3, 1974

[21] Appl. No.: 466,625

[30] Foreign Application Priority Data

Feb. 15, 1974 Netherlands ........................ 7402078

[52] U.S. Cl. .................... 178/6.7 A; 360/28; 360/33

[51] Int. Cl. .............................................. G11b 5/02

[58] Field of Search .................179/100.3 R, 100.4 M, 100.4 D; 178/6.7 A; 360/28, 33

[56] References Cited

UNITED STATES PATENTS

| | | | |
|---|---|---|---|
| 3,488,452 | 1/1970 | Gunning et al. | 360/28 |
| 3,506,778 | 4/1970 | Carlson | 360/28 |
| 3,507,983 | 4/1970 | Leman | 360/28 |
| 3,548,112 | 12/1970 | Pearson | 360/28 |

*Primary Examiner*—Vincent P. Canney
*Attorney, Agent, or Firm*—Frank R. Trifari; Henry I. Steckler

[57] ABSTRACT

An apparatus for reading a disc-shaped record carrier on which a video signal is recorded in optically coded form. To compensate for the varying frequency response of the record carrier as a function of the radial scanning position a correction device is provided. Said correction device employs the amplitude of a first carrier which is modulated with the luminance information of the video signal as a measuring signal, which is compared with a reference signal, the resultent signal controlling a correction filter. As reference signal the amplitude of a signal component of a relatively low frequency may be used, for example a pilot signal or a second carrier which is frequency-modulated with sound information.

7 Claims, 3 Drawing Figures

APPARATUS FOR READING A DISC-SHAPED RECORD CARRIER

The invention relates to an apparatus for reading a disc-shaped record carrier on which a video signal is stored in an optically coded form, which signal comprises a first signal component consisting of a first carrier which is frequency-modulated with the luminance information.

Such a record carrier is described in U.S. Pat. Application No. 229,285, filed Feb. 25, 1972, now continuation No. 396,399, filed Sept. 12, 1973. Such a record carrier comprises a spiral track or, as the case may be, a number of concentric tracks. Such a track comprises a pattern of blocks alternating with areas, the video information being contained in lengths of said blocks and areas. Said blocks and areas may then have mutually different reflection or absorption coefficients, so that an incident light ray is reflected or absorbed to a greater or smaller extent. Alternatively, recesses may be pressed into the disc at the location of the blocks, so that a high-low structure is obtained.

As already stated, such a record carrier is read with the aid of a light ray, for which purpose said record carrier is rotated and the scanning light-ray is aimed at the track so that the information contained in said track can be read. The maximum frequency that can be recorded on such a record carrier without the playing time becoming too short is rather limited. This is one of the reasons why a standard colour television signal is generally not directly recorded on this type of record carriers, but that use is made of a special signal coding. In a frequently employed coding system the luminance information is separated from the other signal components, such as the chrominance signal and the audio signal, and is added to a first carrier as a frequency modulation, which first carrier is situated in the upper part of the pass band of the record carrier. The other signal components are then transposed with the aid of conversion means to the frequency band below the first-order lower side band corresponding to the highest modulation frequency of said frequency-modulated first carrier. It has been found that good results may be achieved with this type of record carriers with a relatively small bandwith using such a coding system.

When the disc-shaped record carrier is driven at constant speed, which is generally the case, it appears that the transmission frequency characteristic of the record carrier changes as a function of the diameter of the disc being read. At decreasing diameter and constant speed, the maximum frequency that can be recorded and read, will decrease, so that the transmission frequency characteristic of the record carrier will roll of more rapidly at decreasing diameter. This gives rise to a less satisfactory signal transmission, especially of the luminance signal, because the modulated first carrier is situated in the very frequency band in which these changes occur.

It is an object of the invention to provide a method which in a very simple manner enables a compensation for said changing transmission characteristic of the record carrier as a function of the reading diameter. The apparatus according to the invention is therefore characterised in that the apparatus is provided with a correction device for the automatic correction of changes in frequency response of the record carrier as a result of a change of the radial scanning position on the record carrier, which correction device includes a correction filter, to which the detected video signal is applied and which has a frequency response which is variable as a function of a control signal which is applied to the control input of the said correction filter, whilst furthermore a first filter is provided for extracting the first signal component, a first detection circuit for the detection of the amplitude of said first signal component, an integration filter with a large time constant to which the output signal of said detection circuit is applied, a comparator circuit for comparing the output signal of the integration filter with a reference signal and for supplying the control signal for the correction filter in response to the difference measured between the two input signals of said comparator circuit.

Thus, the invention employs the first signal component, the modulated first carrier, as a pilot signal. Said first signal component has a constant amplitude, because the information is frequency modulated. However, said pilot signal is not, as usually, a signal of one fixed frequency, but varies as regards its frequenct within the extreme frequency values of the modulated first carrier. As the transfer function of the record carrier is not flat within said frequency band which is occupied by the first signal component, said variation of the frequenct of the pilot signal gives rise to variations of the amplitude of the detected signal component. However, it has appeared that said amplitude variations may readily be separated from the variations owing to a changing scanning diameter, because the last-mentioned variations are substantially slower than the first-mentioned variations. The first-mentioned variations are caused by the luminance variations in the recorded television picture, which have a relatively high frequency. However, the speed of variation caused by the changing scanning diameter is determined by the playing time. It will be evident that said speed of variation is very small for a playing time of for example 20 minutes. By means of the integration filter it is therefore possible to eliminate the influence of the first-mentioned variations on the correction filter, at least substantially.

In this embodiment of the correction device it is assumed that the absolute value of the transfer function does not vary, i.e. that the low-frequency gain is constant. Generally, an automatic gain control is provided so that said low-frequency gain is actually maintained constant. However, the device according to the invention enables a control to be realized which is independent of possible variations of the low-frequency gain.

A preferred embodiment of the apparatus according to the invention is therefore characterized in that the reference signal is derived from a second signal component contained in the recorded video signal, which second signal component has a fixed amplitude and a comparatively low frequency relative to the first signal component, for which purpose the correction device includes a second filter for separating said second signal component from the detected video signal, and a second detection circuit for detecting the amplitude of said second signal component, which measured amplitude value is applied to the comparator circuit as the reference signal.

Since the ratio of the amplitudes of the two pilot signals, the first and the second signal component, is now maintained constant, the variation of the transfer function between these two pilot signals remains equal irrespective of possible variations of the low-frequency gain.

As a second signal component it is possible to simply employ a pilot signal which is contained in the video signal. Such a pilot signal is generally already available for other purposes, as will be further outlined in the description of the Figures.

As a second signal component it is alternatively possible to use a frequency-modulated second carrier. The variable frequency then does not give rise to amplitude variations, because in this low frequency range the transfer function of the present record carrier is flat, in contradistinction to magnetic record carriers. Said second signal component may therefore readily contain information in this second case.

The first filter, which extracts the first signal component from the video signal is preferably connected to the output of the correction filter, because in this way a closed system is obtained.

The invention will be described in more detail with reference to the Figures, of which:

FIG. 1 shows a transmission characteristic of a disc-shaped record carrier, on which the information is recorded in optically coded form As can be seen in the Figure, said record carrier has a bandwidth larger than 8MHz (characteristic $F_1$), the exact value of course being variable as a function of the recording process, the processing of the disc and the read method.

It has been found that the variation of said transmission characteristic depends upon the reading diameter. At the outer circumference of the disc, largest diameter, the transmission characteristic is flattest and the largest bandwidth is obtained (characteristic $F_1$). When the speed of the disc is constant, the bandwidth decreases at decreasing diameter and the transfer function rolls of more rapidly in the higher frequency range (characteristic $F_2$).

Figure 2:
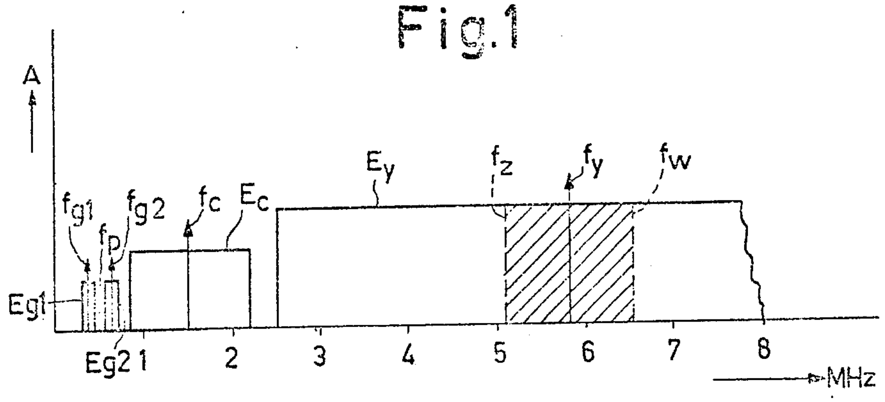
FIG. 2 shows a frequency spectrum of a recorded video signal, and FIG. 3 schematically shows the correction device according to the invention.

Said variation of the transmission characteristic of the record carrier has an adverse effect on the quality of the signal transmission. This will become evident when considering the spectrum of the video signal as it is usually recorded on such a record carrier, which spectrum is shown in FIG. 2, the method of recording being, for example, described in U.S. Pat. application No. 344,863, filed Mar. 26, 1973.

The luminance information of the recorded colour television signal is frequency-modulated on a first carrier. It is assumed that the said modulated first carrier wave has a frequency sweep, which ranges from $f_z = 5.2$ MHz, corresponding to peak black, to $f_w = 6.5$ mHz, corresponding to peak white. The average grey level is represented as the carrier wave $f_y$. The frequency band $E_y$ required for said luminance information extends to 2.5 MHz towards the lower frequencies, because in any case the first-order lower sideband of said modulated carrier wave must also be transmitted.

The chrominance information of the colour television signal is contained in a frequency band $E_c$ below the frequency band $E_y$ as a modulation of a carrier wave $f_c$. This can be achieved in known manner by mixing the chrominance signal contained in the standard colour television signal with a suitable mixing frequency. In the Figure the value 1.5 MHz is selected for $f_c$ and a bandwidth of 1.2 MHz for $E_c$.

Below said frequency band $E_c$ two audio signals are recorded as frequency modulations of two carrier waves $f_{g1}$ and $f_{g2}$, covering the frequency bands $E_{g1}$ and $E_{g2}$these two frequency bands may contain the stereo sound signal associated with the colour television signal. Moreover, a pilot signal $f_p$ is recorded between these two frequency bands $E_{g1}$ and $E_{g2}$. Said pilot signal is frequently employed in re-converting the chrominance signal $E_c$ to the standard chrominance carrier frequency corresponding to the standard colour signal, so as to eliminate phase errors in said chrominance signal as a result of speed variations of the record carrier. The correct position of said pilot signal $f_p$ relative to the two sound signals is of no further significance.

Figure 1:
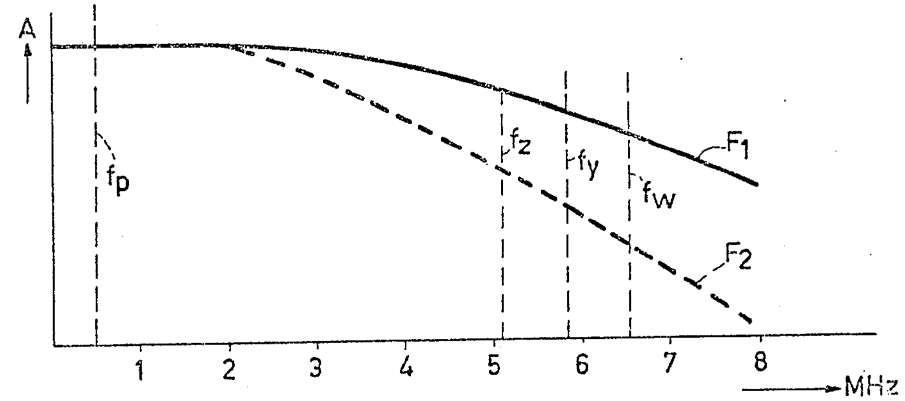
FIG. 1 shows to transfer functions of a disc-shaped record carrier with a video signal which is recorded in an optically coded form.

As a comparison of FIG. 2 with FIG. 1 reveals, the frequency sweep $f_z - f_w$ of the luminance signal lies just within the frequency range in which the variation of the transmission characteristic of the record carrier as a function of the diameter occurs. It has a very adverse effect on the signal transfer of the luminance signal. In these systems modulation of the luminance information contained in the modulated first carrier is generally effected through single-sideband demodulation. However, as is known, the frequency response with this method of frequency demodulation at the transistion from the first-order lower sideband to the carrier wave and, as the case may be, the first-order upper sideband, is of special importance and is subject to stringent requirement in view of a correct demodulation. In this respect it is of course particularly disadvantageous if the said frequency response changes as a function of the scanning diameter when playing back a disc-shaped record carrier.

Figure 3:
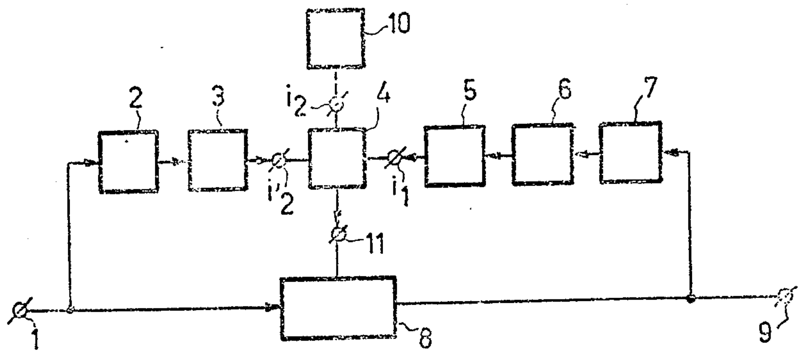

In order to improve this, the invention employs a correction device as shown in FIG. 3. Said device includes a correction filter 8, to which via an input terminal 1 the video signal which has been read from the record carrier is applied. Said correction filter 8, has a variable frequency response, whose variation is determined by a control signal which is applied to the control terminal 11 of said correction filter. The output signal of said correction filter 8 is available at an output terminal 9 and is also applied to a filter 7. Said filter 7 has a band-pass characteristic with a pass-band from for example 5.2 to 6.5 MHz and as a result, it extracts the FM-modulated first carrier from the read out video signal. Said extracted FM-modulated first carrier is applied to an amplitude detector 6, whose output signal is applied to an integration filter 5. The output signal of said integration filter 5 is fed to a first input $i_1$ of a comparator circuit 4, to a second input $i_2$ which a reference signal supplied by a reference 10 is applied. The output signal of said comparator circuit 4 is finally fed to the control input 11 of the correction filter 8 as the control signal.

The operation of the device can simply be explained with reference to FIG. 1. As previously stated, the modulated first carrier lies within the frequency range in which the transmission characteristic of the record carrier varies as a function of the diameter at which the record carrier is read out. To illustrate this, the carrier wave frequency $f_y$ and the minimum and the maximum frequency $f_z$ and $f_w$ are shown dotted in FIG. 1. As the first carrier is only frequency-modulated and thus has a constant amplitude, the amplitude of said modulated first carrier wave, according to the invention, may serve as a measuring signal for the instantaneous variation of the transmission characteristic of the record carrier. If the transmission characteristic of the record carrier changes from the response $F_1$ into the response $F_2$, the amplitude of the modulated first carrier wave, which is measured by the amplitude detector 6, will decrease.

In order to be able to use said measured amplitude variations for controlling the correction filter 8, however, the integration filter 5 is required. requied. The modulated first carrier wave has no fixed frequency but a frequency which varies between the minimum value $f_z$ and the maximum value $f_w$. Should the transmission characteristic of the record carrier be flat in said frequency range, this would have no effect at all. In reality, the transmission characteristic in said frequency range exhibits a declining character, as can be seen in FIG. 1. This means that variations of the amplitude of said modulated first carrier occur as a function of the picture content. Indeed, if the luminance signal varies from peak black, frequency $f_z$, to peak white, frequency $f_w$, the amplitude of said modulated first carrier will decrease.

In order to minimize the influence of this type of amplitude variations of the modulated first carrier wave on the correction filter, the integration filter 5 is provided, which has a large time constant. The amplitude variations as a result of variations of the picture content generally have a comparatively high frequency relative to the amplitude variations as a result of a variation of the read or scanning diameter. The total variation of the amplitude as a result of the variation of the read diameter will occur in a time equal to the playing time, for example 20 min. If said integration filter for example has a time constant of a few seconds, the amplitude variations as a result of the changing read diameter will be transferred, whilst the amplitude variations as a result of the frequency variations of the modulated first carrier are rejected at least substantially.

Consequently, a direct voltage is applied to the terminal $i_1$ of the comparator circuit 4, which voltage is a measure of the variation of the transmission characteristic in the frequency range of the modulated first carrier as a function of the read diameter. By comparison of the reference voltage applied to the terminal $i_2$, a control signal is obtained which can be applied to the control terminal 11 of the correction filter 8 and in conjunction with the said correction filter can automatically correct the overall transfer function. The correction network should then provide an increasing high-frequency response at decreasing read diameter in order to compensate for the roll-off of the transmission characteristic of the record carrier.

In this embodiment of the device according to the invention it is assumed that the low-frequency part of the transfer function does not exhibit variations in magnitude, i.e. the level of the transmission characteristic shown in FIG. 1 does not vary. Generally, an automatic gain control is provided, which ensures that this assumption is valid.

However, it is also possible to make the correction of the frequency response independent of possible variations of said low-frequency level. For this purpose, instead of a fixed reference signal for the comparator circuit 4, use can be made of a reference signal which is derived from the detected video signal. For this the pilot signal $f_p$ is extracted from the detected video signal for example with the aid of a filter 2. With the aid of an amplitude detector 3 the amplitude of said pilot signal $f_p$ is determined and the direct voltage corresponding to said measured amplitude value is used as reference signal at an input $i_2'$ of the comparator circuit instead of the signal from the reference source 10. The reference source 10 may then be dispended with.

As the pilot signal $f_p$ has a frequency which is situated in the low-frequency part of the transmission characteristic of the record carrier, variations of said low-frequency part are automatically included in the reference signal which is now used at the input $i_2'$ of the comparator circuit. Thus the radio between the amplitudes of said pilot signal $f_p$ and the modulated first carrier is so that the shape of the transfer characteristic is maintained at all times.

Instead of the pilot signal $f_p$ it is also possible to use one of the sound signals $E_{g1}$ or $E_{g2}$ for obtaining the reference signal. This is because these signals also have a constant amplitude. It is true that said signals, like the luminance signal have a certain frequency sweep, but because the transmission characteristic is flat within the relevant low-frequency region, this presents no problems at all.

What is claimed is:

1. An apparatus for reading a disc-shaped record carrier in which a video signal is recorded in an optically coded form, which signal comprises a first carrier signal component which is frequency-modulated with the luminance information, the apparatus including a correction device for automatically correcting variations in the frequency response of the record carrier as a result of a change of the radial scanning position on the record carrier, said correction device including a correction filter having an input means for receiving at least the detected first carrier signal component, a control input means for varying the frequency response of said correction filter, and an output; a first filter means for extracting the first signal component, a first detection circuit means coupled to said first filter for detecting the amplitude of said first signal component, an integration filter coupled to the output of said detection circuit and which has a relative large time constant, and a comparator circuit means for comparing the output signal of the integration filter with a reference signal and having an output means for supplying a control signal to said control input of the correction filter in response to the difference measured between the two input signals of said comparator circuit.

2. An apparatus as claimed in claim 1, wherein a second signal component is contained in the recorded video signal and which has a fixed amplitude and a comparatively low frequency relative to the first signal component, the correction device further comprising a second filter means for extracting said second signal component from the detected video signal and a second detection circuit means coupled to said second filter and to said comparator for detecting the amplitude of said second signal component and for applying the detected second signal to the comparator circuit as reference signal.

3. An apparatus as claimed in claim 2, wherein the second signal component comprises a pilot signal which is included in the video signal.

4. An apparatus as claimed in claim 2, wherein the second signal component comprises a frequency-modulated second carrier included in the video signal.

5. An apparatus as claimed in claim 4, wherein the modulated second carrier comprises the second information associated with the video signal.

6. An apparatus as claimed in claim 1, wherein the first filter is coupled to the output of the correction filter.

7. An apparatus as claimed in claim 1, wherein said correction filter input means receives all of the recorded signal.

* * * * *

UNITED STATES PATENT AND TRADEMARK OFFICE

CERTIFICATE OF CORRECTION

PATENT NO. : 3,906,152

DATED : Sept. 16, 1975

INVENTOR(S) : Adrianus H. Hoogendijk

It is certified that error appears in the above-identified patent and that said Letters Patent are hereby corrected as shown below:

col. 4, line 8, change "these" to -- . These --;

line 33, change "quirement" to -- quirements --;

col. 5, line 12, cancel "required. requied" and insert -- also required --;

claim 5, line 2, cancel "second infor-" and insert -- sound infor- --;

Signed and Sealed this

Sixteenth Day of November 1976

[SEAL]

*Attest:*

RUTH C. MASON
*Attesting Officer*

C. MARSHALL DANN
*Commissioner of Patents and Trademarks*